(12) United States Patent
Hux

(10) Patent No.: US 9,683,191 B1
(45) Date of Patent: Jun. 20, 2017

(54) TIRE LUBRICANT

(71) Applicant: Ruel Aaron Hux, Tulsa, OK (US)

(72) Inventor: Ruel Aaron Hux, Tulsa, OK (US)

(*) Notice: Subject to any disclaimer, the term of this patent is extended or adjusted under 35 U.S.C. 154(b) by 61 days.

(21) Appl. No.: 14/523,053

(22) Filed: Oct. 24, 2014

Related U.S. Application Data

(60) Provisional application No. 61/895,842, filed on Oct. 25, 2013.

(51) Int. Cl.
| | |
|---|---|
| *C10M 169/04* | (2006.01) |
| *C10M 111/04* | (2006.01) |
| *B60C 25/05* | (2006.01) |
| *C10M 111/00* | (2006.01) |
| *C10M 101/02* | (2006.01) |
| *C10M 107/50* | (2006.01) |
| *C10M 111/02* | (2006.01) |

(52) U.S. Cl.
CPC ........... *C10M 111/04* (2013.01); *B60C 25/05* (2013.01); *C10M 111/00* (2013.01); *C10M 169/04* (2013.01); *C10M 101/02* (2013.01); *C10M 107/50* (2013.01); *C10M 111/02* (2013.01); *C10M 2203/1006* (2013.01); *C10M 2229/0405* (2013.01); *C10M 2290/02* (2013.01)

(58) Field of Classification Search
CPC ... B60C 25/05; C10M 101/02; C10M 107/50; C10M 111/00; C10M 111/02; C10M 111/04; C10M 2203/1006; C10M 2229/0405; C10M 2290/02
See application file for complete search history.

(56) References Cited

U.S. PATENT DOCUMENTS

| | | | | |
|---|---|---|---|---|
| 4,665,116 A | * | 5/1987 | Kornhaber | ............... C09G 1/02 524/268 |
| 2005/0266166 A1 | * | 12/2005 | Halsey | ................ C10M 105/76 427/372.2 |

\* cited by examiner

*Primary Examiner* — Taiwo Oladapo
(74) *Attorney, Agent, or Firm* — GableGotwals

(57) ABSTRACT

A non-water-based tire lubricant includes a thickening agent and a thinning agent. The thickening agent may be a silicone grease or hydrotreated light petroleum distillates, and the thinning agent may be a blend of petroleum distillates and additives or a silicone liquid. The tire lubricant has a pliable consistency, is easier to apply and use than standard tire lubricants, and is not water-based so that nitrogen concentrations inside the tire are maintained at 100 percent.

11 Claims, No Drawings

TIRE LUBRICANT

CROSS REFERENCE TO PENDING APPLICATIONS

This application claims the benefit of U.S. Provisional Pat. Appl. 61/895,842 for Tire Lubricant filed on Oct. 25, 2013.

BACKGROUND OF THE INVENTION

Tires consist of a tread that contacts the road surface, a bead that contacts the inner and outer rims of the wheel, and a sidewall that connects the bead to the tread. In order to mount the tire on the wheel, the bead is forced into the channel formed by the inner and outer rims and the tire is then inflated. However, in order for the tire to inflate properly, the bead must be tightly sealed against both rims. Proper sealing of the bead also prevents the tire from shifting circumferentially as the wheel rotates.

Tire lubricant is often used to help set the bead of the tire and seal it against the rims of the wheel. However, these lubricants generally have high viscosity and are not very pliable, which makes them difficult to apply and use. In addition, they are frequently water-based. As a result, they are not suitable for use in applications where the tire should be filled with 100 percent nitrogen because they can introduce water, moisture, or both into the nitrogen.

Mounting new tires also poses a safety hazard. While manufacturers warn installers to never exceed 40 psi when seating beads, it is in many cases necessary to exceed this maximum psi, and in some cases double it, in order to seat the beads.

Therefore, there is a need for a tire lubricant with a consistency that is more pliable and less viscous than standard tire lubricants. There is also a need for a tire lubricant that is not water-based so that the nitrogen concentration inside the tire is maintained at 100 percent. Last, there is a need for a tire lubricant that results in lower bead seating pressures and, in no cases, exceeds the maximum 40 psi limit.

SUMMARY OF THE INVENTION

This invention provides a tire lubricant containing a thickening agent and a thinning agent. The thickening agent may be a silicone grease or hydrotreated light petroleum distillates, and the thinning agent may be a blend of petroleum distillates and additives or a silicone liquid. In a preferred embodiment, the thinning agent is a liquid silicone, polydimethylsiloxane. Preferably, the ratio of hydrotreated light petroleum distillate to polydimethylsiloxane is about 1-to-2.

Objectives of the invention include providing a tire lubricant that (1) has a pliable consistency; (2) is less viscous than standard tire lubricants; (3) is easier to apply and use than standard tire lubricants, especially when mounting tires on steel or aluminum wheels; (4) is not water-based so that nitrogen concentrations inside the tire are maintained at 100 percent; and (5) requires lower pressures to seat the beads and does not exceed the maximum 40 psi limit.

DETAILED DESCRIPTION OF THE PREFERRED EMBODIMENTS

This invention describes a tire lubricant that contains a mixture of a thickening agent and a thinning agent. In one embodiment of the invention, the ratio of thickening agent to thinning agent may be approximately three-to-one. The thickening agent may be a silicone grease, such as MP Silicone Grease (Jet-Lube, Inc., Houston, Tex.). The thinning agent may be a blend of petroleum distillates and additives, such as Black Magic Tire Wet (SOPUS Products, Houston, Tex.).

In another, more preferred, embodiment of the invention, the thickening agent may be hydrotreated light distillates (petroleum) CAS 64742-47-8, such as CALPRINT-35™ lubricant (Calumet Lubricants Co. CCV, Cotton Valley, La.), and the thinning agent may be polydimethylsiloxane CAS 63148-62-9, such as Q7-9120™ silicone fluid, 12,500 CST (Dow Corning Corporation, Midland, Mich.). Hydrotreated light distillates (petroleum) are C13-14 isoparaffins, and may also be known as hydrotreated kerosene, hydrotreated light petroleum distillates, light distillate fuel oils, or hydrotreated light distillate. The tire lubricant may contain from one to 99 percent of the thickening agent and from one to 99 percent of the thinning agent, both by weight.

As an alternative, the tire lubricant may contain approximately 33 percent thickening agent (e.g. Calprint-35) by weight, and approximately 67 percent silicone fluid, also by weight (e.g. Q7-9120) or a ratio of 1-to-2 of hydrotreated light distillates (thickener) to polydimethylsiloxane (thinner). This embodiment, which the inventor calls QUICK SEAT™ tire lubricant, has a flash point that exceeds 235° F., a boiling point above 450° F., a vapor pressure of approximately 0.00168 psia at 68° F., a freezing point of less than −60° C., and a specific gravity of approximately 0.79 at 60° F.

The tire lubricant may also range from 70% hydrotreated light distillates by weight, 30% polydimethylsiloxane to 30% hydrotreated light distillates, 70% of polydimethylsiloxane.

In addition to the identified products, other products with similar characteristics may be substituted for the thickening agent, the thinning agent, or both. The relative amounts of the thickening and thinning agents in the tire lubricant may also vary depending upon the desired use, the temperature at which the lubricant is stored and applied, and other factors.

The inventive tire lubricant has a pliable consistency and lower viscosity than conventional tire lubricants, making it easier to apply and use. Preferably, the viscosity is in a range of 1550 to 1750 cP @ 25° C. In addition, the inventive tire lubricant is not water-based (water free), making it particularly suitable for use when the tire is to be inflated with 100 percent nitrogen. Unlike a water-based tire lubricant, which can introduce moisture into the nitrogen inside the tire, the inventive tire lubricant does not introduce contaminants into the interior of the tire and maintains the nitrogen concentration at 100 percent.

A method for mounting a tire onto a rim includes the steps of applying a tire lubricant comprised of a hydrotreated light petroleum distillate and a polydimethylsiloxane to an inner or outer bead of the tire and mounting the tire onto the rim. The tire lubricant allows for lower seating pressures, typically in a range of 20 to 25 psi and, in some cases, below 20 psi.

Table 1 below shows the results of tests conducted using a P205/70R14 KUMHO TIRES® tire mounted to different rim material, inflated to 44 psi, and subjected to a radial load of 1521 pounds until a slip at the tire or plate interface occurs noting the end of travel. Slip values were recorded every one-quarter inch until the end of travel. The inner and outer bead seating pressure is generally lower than in a no-lube condition Although the lubricant allows for slippage, this initial travel does not pose any problems when the mounted tire is in use.

While preferred embodiments of a tire lubricant have been described, a person of ordinary skill in the art understands that certain changes can be made in the type of components used in the lubricant and the way the components are mixed without departing from the scope of this disclosure. The lubricant may also be used in other situations where a first object such as a rubber or synthetic rubber component (e.g., gasket, bushing, garment, or sleeve) is friction fit over a second object such as metal or plastic component, or where such a fitting needs to be released.

TABLE 1

Slip test results for P205/70R14 Tire Mounted on Aluminum, Steel and Chrome Wheel Rims and Subjected to a 1521 Pound Radial Load.

| | Aluminum 14 × 6 | | | Steel 14 × 5.5 | | | Chrome 14 × 7 |
|---|---|---|---|---|---|---|---|
| Size | No Lube | QUICK SEAT | 2 hour soak | No Lube | QUICK SEAT | | No Lube |
| OB psi | 21 | 19 | — | 19 | 12 | 19 | 25 |
| IB psi | 12 | 3 | — | 26 | 5 | 3 | 18 |
| Travel | | | | Tangential Load (in pounds) | | | |
| 0.00 | 0 | 0 | 0 | 0 | 0 | 0 | 0 |
| Slip | 489 | 421 | 421 | 259 | 98 | 421 | 291 |
| 0.25 | 1453 | 489 | 489 | 1758 | 557 | 489 | 1954 |
| 0.50 | 2598 | 481 | 481 | 1933 | 561 | 481 | 2444 |
| 0.75 | 3164 | 461 | 461 | | 551 | 461 | |
| 1.00 | | 457 | 457 | | 551 | 457 | |
| 1.25 | | 454 | 454 | | 543 | 454 | |
| 1.50 | | | 525 | | | | |
| 1.75 | | | 520 | | | | |
| 2.00 | | | 512 | | | | |
| 2.25 | | | 496 | | | | |
| 2.50 | | | 490 | | | | |
| 2.75 | | | 485 | | | | |

What is claimed:

1. A tire lubricant consisting of:
   a hydrotreated light petroleum distillate; and
   a polydimethylsiloxane.

2. A tire lubricant according to claim 1 wherein the ratio of hydrotreated light petroleum distillate to polydimethylsiloxane is about 1-to-2.

3. A tire lubricant according to claim 1 wherein the percent by weight of hydrotreated light petroleum distillate is less than that of the polydimethysiloxane.

4. A tire lubricant according to claim 1 wherein the percent by weight of the hydrotreated light petroleum distillate is in a range of 30 to 70% by weight.

5. A tire lubricant according to claim 1 wherein the percent by weight of the polydimethysiloxane is in a range of 30 to 70% by weight.

6. A method for mounting a tire onto a rim, the method comprising the steps of:
   applying a tire lubricant comprised of a hydrotreated light petroleum distillate and a polydimethylsiloxane to a bead of the tire; and
   mounting the tire onto the rim.

7. A method according to claim 6 wherein the tire lubricant is water-free.

8. A method according to claim 6 wherein the ratio of hydrotreated light petroleum distillate to polydimethylsiloxane is about 1-to-2.

9. A method according to claim 6 wherein the percent by weight of hydrotreated light petroleum distillate is less than that of the polydimethysiloxane.

10. A method according to claim 6 wherein the percent by weight of the hydrotreated light petroleum distillate is in a range of 30 to 70% by weight.

11. A method according to claim 6 wherein the percent by weight of the polydimethysiloxane is in a range of 30 to 70% by weight.

* * * * *